Figure 5:
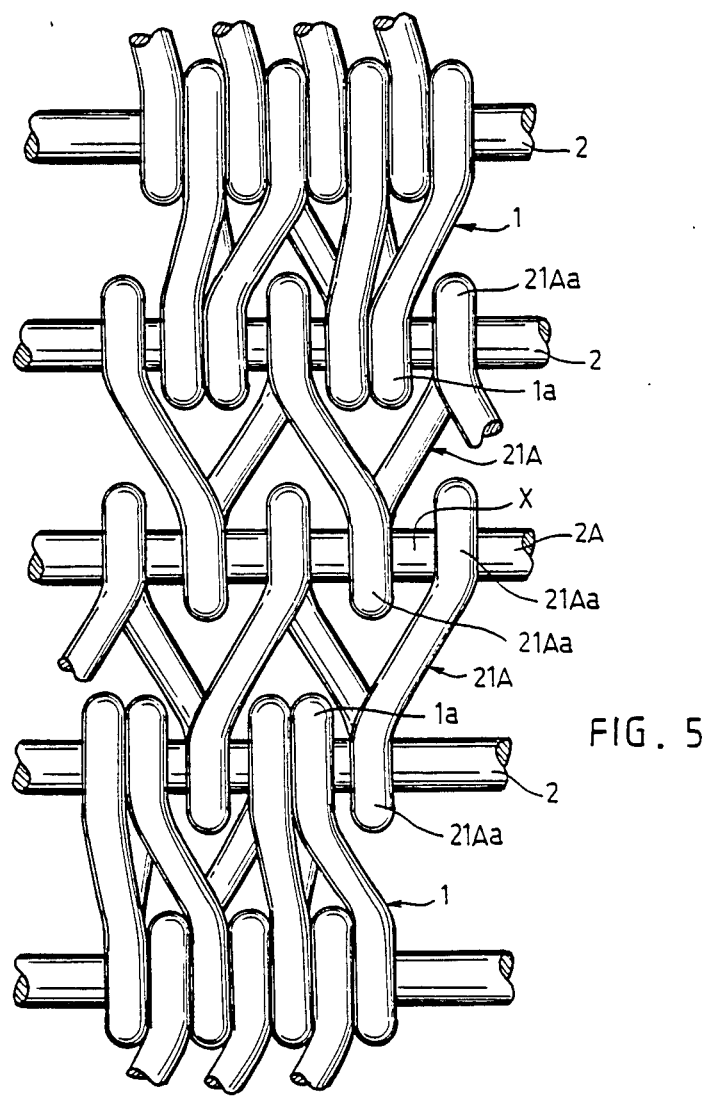

United States Patent [19]

Salminen

[11] Patent Number: 4,695,015

[45] Date of Patent: Sep. 22, 1987

[54] IMPROVEMENTS RELATING TO BELTS OF INTER-WOVEN SPIRAL WIRES

[75] Inventor: Ari Salminen, Suorama, Finland

[73] Assignee: Tamfelt Oy Ab, Tampere, Finland

[21] Appl. No.: 837,360

[22] Filed: Mar. 6, 1986

[30] Foreign Application Priority Data

Mar. 22, 1985 [FI] Finland .................................. 851165

[51] Int. Cl.$^4$ ............................................. B21F 27/08
[52] U.S. Cl. .......................................... 245/6; 245/4; 245/10; 59/83; 59/901; 198/848
[58] Field of Search ......................... 245/4, 5, 6, 9, 10; 59/79.2, 80, 1, 20, 35.1, 83, 901; D11/18, 19, 20; 63/4, 5 R, 5 A, 6; 198/848, 849; 139/425 R

[56] References Cited

U.S. PATENT DOCUMENTS

| 259,989 | 6/1882 | Pickhardt | 245/6 |
| 1,583,046 | 5/1926 | Ingle | 245/6 |
| 1,673,527 | 6/1928 | Peiler | 245/6 |
| 1,868,586 | 7/1932 | Pink | 245/6 |
| 1,895,345 | 1/1933 | Pink | 245/6 |

OTHER PUBLICATIONS

"Cambridge Conveyor Belts" 1941, pp. 56, 73, 74, 75, 118 and 119, The Cambridge Wire Cloth Co.

Primary Examiner—Robert L. Spruill
Assistant Examiner—David B. Jones
Attorney, Agent, or Firm—Lowe Price LeBlanc Becker & Shur

[57] ABSTRACT

A spiral wire, comprising adjacent thread spirals (1) positioned in pairs with loops thereof interlapping to form transverse rows of loops in the wire, and linking threads (2) inserted in the rows of loops. The opposite ends of the spiral wire are interconnected by means of a seam thread (2A) into an endless wire. In order to make it easier to insert the seam thread, a clearance (X) is provided between the interlapping loops (1Aa) of the two spirals (1A) forming the seam position, which clearance extends in the direction of the seam thread so that the loops are able to yield with respect to each other in that direction. The spirals of the seam portion are preferably made of a thinner thread, a thread having a flat cross-section or interconnected with a sparser spacing of the loops.

9 Claims, 5 Drawing Figures

U.S. Patent  Sep. 22, 1987  Sheet 1 of 2  4,695,015
FIG. 2  FIG. 1
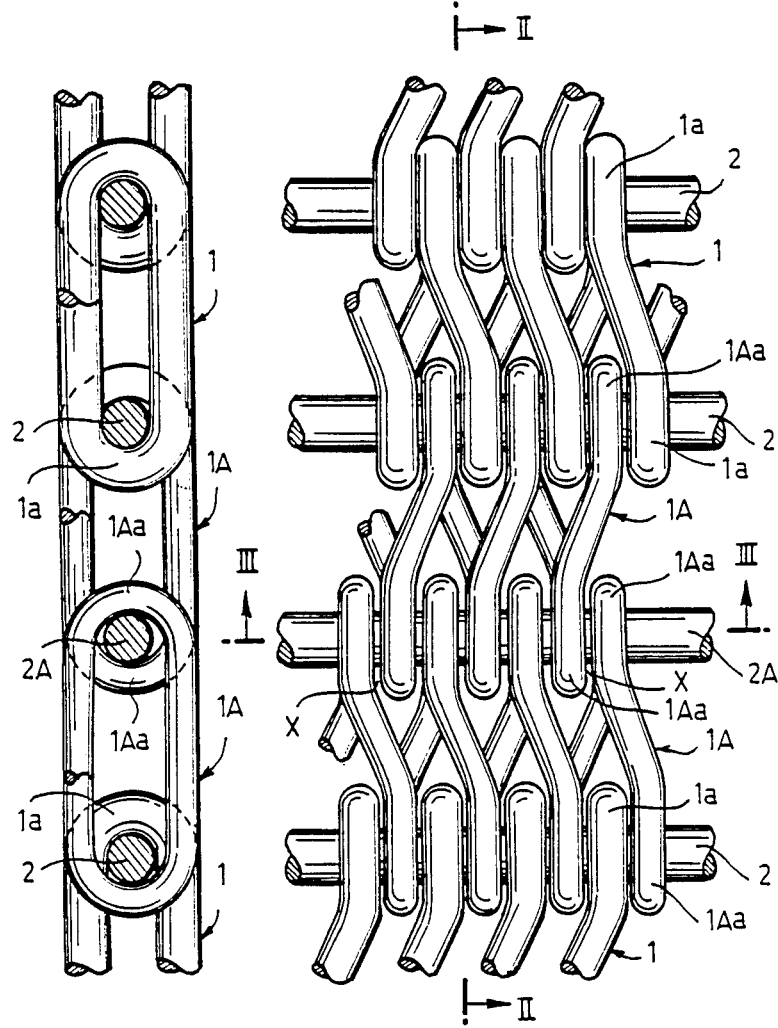
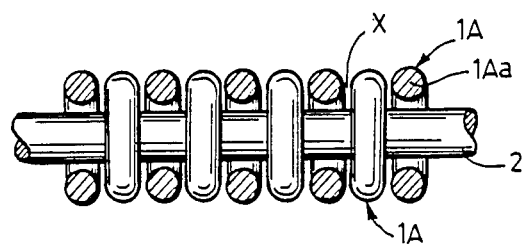
FIG. 3

IMPROVEMENTS RELATING TO BELTS OF INTER-WOVEN SPIRAL WIRES

This invention relates to spiral wire, comprising
adjacent thread-like spirals positioned in pairs with loops thereof interlapping and in contact with each other forming transverse rows of loops in the wire, and
linking threads inserted in said rows of loops, the loops of adjacent spirals being pressed against said linking threads alternately from opposite sides,
whereby one pair of spirals forms a seam portion wherein the ends of the spiral wire are interconnected to form an endless wire.

The expression "wire" is here intended to include not only conventional drying and filtering wires but also bottom cloths of press felts, different kinds of conveyor belts and other such products having a wire-like spiral structure.

A spiral wire or woven wire belt is formed by a plurality of spirals extending in the transverse direction of the wire and interconnected by means of connection or seam threads which extend through the loops of adjacent spirals. Seaming of a planar spiral structure into an endless wire is carried out in a machine in which the wire extends around rolls, cylinders or the like by drawing together both ends of the wire to be seamed so that the loops thereof interlap and by inserting a seam thread through the interlapping loops.

A disadvantage of present spiral wires is that they are difficult to be seamed. The structure of the seam portion is similar to that of the wire itself, whereby the loops of the spirals interlap in close contact with each other also in the seam area. Because the seaming is carried out after the wire has been placed in the machine, it is difficult to get the holes of the loops in the seam area to be positioned accurately in line with each other, which makes inserting of the seam thread through the holes more difficult.

For the elimination of this problem it has been suggested previously that the loops which are to form the seam portion should be made wider than the loops of the other spirals so that the seam thread can be inserted through such loops with a predetermined radial clearance. This kind of loop structure does somewhat facilitate the inserting of the seam thread but it does not yet ensure an easy and rapid seaming. This is due to the fact that when the wire is placed in the machine, it is always distorted and strained, which makes it difficult to position the tightly contacting loops in line with each other with a sufficient accuracy. If such wider loops are used, the seam area becomes thicker than the rest of the wire.

The object of this invention is to provide a spiral wire which avoids the above disadvantages and which can be seamed in a simpler way. This is achieved by means of a spiral wire according to the invention, which is characterized in that a clearance is provided between the interlapping loops of the two spiral forming the seam portion, said clearance extending in the direction of the linking thread which interconnects said loops.

The invention is based on the idea that even though the spiral loops otherwhere in the wire are positioned in tight contact with each other in the axial direction of the seam threads, the loops in the seam area are spaced from each other in the axial direction of the seam thread. The seaming can be carried out more easily and more rapidly by virtue of the axial clearance obtained between the loops. Tests carried out show that it is easier for the seam thread to find its way through loops spaced from each other in the axial direction of the seam thread than through loops positioned in tight contact with each other, because loops having a clearance therebetween are able to yield to a certain degree with respect ot each other in the direction of the seam thread.

The spirals positioned in the seam area can be similar to the other spirals of the wire, i.e. manufactured of a similar thread, whereby the loops in the seam area can be widened or the inner diameter thereof can correspond to the diameter of the seam thread. The axial clearance between the loops can thereby be provided by attaching the seam spiral to an adjacent conventional spiral with a sparser spacing.

Nevertheless it is of advantage that the loops in the seam area are not only provided with an axial clearance but also with a radial clearance with respect to the seam thread. This can be effected by manufacturing the seam spiral of a thinner thread or of a flat thread, whereby the outer diameter of the loops equals to that of the loops of the adjacent spirals. The seam portion is thereby as thick as the rest of the wire.

Figure 4:
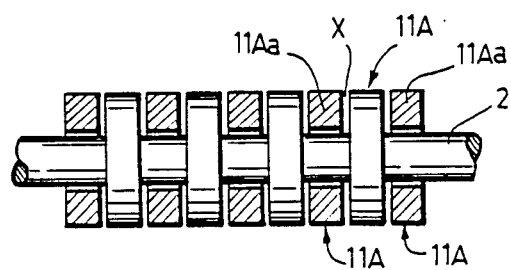

The invention will be described more closely in the following with reference to the attached drawings, wherein FIG. 1 is a top view of a detail of a seam portion of one embodiment of a spiral wire according to the invention, FIGS. 2 and 3 are cross-sectional views along lines II—II and III—III respectively in FIG. 1, FIG. 4 is a cross-sectional view of another embodiment of a spiral wire along the seam, and FIG. 5 is a top view of still another embodiment of the spiral wire.

The spiral wire or woven wire belt shown in FIGS. 1-3 of the drawing is formed by a plurality of spirals 1 which are positioned in parallel side by side in level with each other. The spirals form loops 1a from which the spirals are interconnected. For this purpose the spirals are positioned in pairs with the loops thereof interlapping to form rows of loops extending transversely with respect to the wire. A linking thread 2 is inserted inside each row of loops in such a manner that the loops are pressed against the linking thread alternately on opposite sides.

A planar spiral wire assembled as described above is placed in a machine around rolls or other such suitable means to form a closed link so that the loops 1Aa of the spirals 1A positioned outermost at the ends of the wire interlap. A seam thread 2A is inserted through said loops.

The spiral wire is in a conventional manner subjected to simultaneous stretching and heating for obtaining of a thermal fixation thereof, whereby the spirals are flattened and the wire gets its final shape and a stable structure. In this example, the spirals and the linking threads are made of a polyester monofilament having a thickness of 0.7 mm and 0.9 mm respectively.

According to the invention the spirals 1A in the seam area are manufactured of a thinner thread than the other spirals of the wire, in this particular example of a polyester monofilament having a thickness of 0.55 mm. The outer diameter of the loops 1Aa equals to that of the other loops of the wire so that the inner diameter of the loops exceeds the diameter of the seam thread 2A. The diameter of the seam thread is equal to that of the linking threads 2 in this example. As appears from FIGS. 1 and 3, an axial clearance X exists between the interlapping loops of the thinner interconnected spirals. The interlapping loops of the other spirals of the wire are nevertheless tightly pressed against each other. By virtue of said axial clearances, the loops of the spirals are able to move and yield with respect to each other to a certain degree, whereby it is easier to insert the seam thread through the loops. This inserting is also facilitated by the radial clearance between the loops and the seam thread. In spite of the radial and the axial clearance of the loops, the seam portion is as thick as the rest of the wire.

The embodiment of the spiral wire shown in FIG. 4 differs from the preceding embodiment only in that the spirals 11A in the seam area are made of thread having a flat cross-section, which thread can have the same cross-sectional area as the thread in the other spirals 1 of the wire. Also in this case an axial clearance X is provided between the loops 11Aa of the seam spirals.

The embodiment of the spiral wire shown in FIG. 5 differs from that disclosed in FIG. 1 only as regards the seam portion. The spirals 21A which are positioned in the seam area are made of a thread having the same thickness as the thread of the other spirals of the wire, whereas the seam spirals are both attached to an adjacent spiral 1 with a sparser spacing. In this particular case the loops 21A of the seam spiral are attached to every second spacing between the loops 1A of the adjacent spiral. In this embodiment, too, an axial clearance X is provided between the interlapping loops of the seam spirals. There is no radial clearance provided between the seam thread and the loops of the seam spirals, although this would be possible, too, as described above.

The drawings and the description related thereto are only intended to illustrate the idea of the invention. In its details, the spiral wire according to the invention may vary within the scope of the claims. The seam spirals positioned at opposite ends of the wire can be wound in the same direction, which in certain cases makes it easier to position the loops in an interlapping relationship.

I claim:
1. A spiral wire belt, comprising:
a plurality of pairs of adjacent thread-like spirals (1) formed with loops (1c) and positioned in pairs with said loops (1a) thereof interlapping and in contact with each other to form transverse rows of loops in the wire belt extending the width of the belt and
linking threads (2) inserted in said rows of loops, respectively, the loops of adjacent spirals in contact with each other being pressed against said linking threads alternately from opposite sides, said belt having opposite ends formed by the plurality of said spirals (1) and linking threads (2); and
means defining a seam portion including at least one pair of seam spirals (1A; 11A; 21A) for connecting the ends of the wire belt to form an endless wire belt, said seam spirals being formed with loops (1Aa, 11Aa, 21Aa) interlapping with each other and arranged such that a clearance (X) is provided between substantially each of the interlapping loops (1Aa; 11Aa; 21Aa) of the seam spirals (1A; 11A; 21A) forming the seam portion, and a seam thread (2A) inserted through said loops of the seam spirals to establish said endless wire belt, said clearance extending in the direction of the seam thread (2A) which interconnects said loops of the seam spirals, said clearance (X) being provided between the interlapping loops of the seam spirals only in the seam portion with the interlapping loops of adjacent thread-like spirals (1) being in contact with each other outside the seam portion and without any appreciable clearance therebetween.

2. Belt according to claim 1, wherein the cross-section of a thread forming the seam spirals (1A; 11A) of the seam portion is, in the direction of the linking thread (2A), narrower than the thread which forms the adjacent spirals (1).

3. Belt according to claim 2, wherein the thread of the seam spirals (1A) of the seam portion has a smaller diameter than the thread of the adjacent spirals (1).

4. Belt according to claim 2, wherein the cross-section of the thread of the seam spirals (11A) of the seam portion is generally rectangular.

5. Belt according to claims 2 or 4, wherein the outer diameter of the loops (1Aa; 11Aa) of the seam spirals (1A; 11A) of the seam portion is substantially equal to that of the loops (1a) of the adjacent spirals (1).

6. Belt according to claim 1, wherein the loops (21Aa) of the seam spirals (21A) are attached to the adjacent thread-like spirals (1) such that the clearance between the interlapping loops (21A) of the seam spirals is greater than the clearance between interlapping loops of the seam spirals with adjacent loops (1a) of the thread-like spirals (1).

7. Belt according to claim 6, wherein the thread of the seam spirals (21A) of the seam portion is similar to that of the adjacent spirals (1).

8. Belt according to claim 1, wherein the inner diameter of the loops (1Aa; 11Aa; 21Aa) of the seam spirals (1A; 11A; 21A) of the seam portion exceed the outer diameter of the seam thread (2A).

9. Belt according to claim 1, wherein the loops of the seam spirals are spaced in relation to adjacent interlapping loops of the seam spirals such that said adjacent interlapping loops are generally parallel to each other to establish a substantially constant clearance (X) extending the full length of said interlapping loops of the seam spirals as measured in a longitudinal direction of the belt.

* * * * *